March 24, 1925.

G. W. DAVIS 1,531,077

TRANSMISSION BAND LINING FOR MOTOR VEHICLES

Filed May 12, 1923

Wool

George W. Davis, INVENTOR.

BY Geo. P. Kimmel

ATTORNEY.

Patented Mar. 24, 1925.

1,531,077

UNITED STATES PATENT OFFICE.

GEORGE W. DAVIS, OF NASHVILLE, TENNESSEE, ASSIGNOR OF ONE-HALF TO D. J. PEELER, OF NASHVILLE, TENNESSEE.

TRANSMISSION-BAND LINING FOR MOTOR VEHICLES.

Application filed May 12, 1923. Serial No. 638,543.

*To all whom it may concern:*

Be it known that I, GEORGE W. DAVIS, a citizen of the United States, residing at Nashville, in the county of Davidson and State of Tennessee, have invented certain new and useful Improvements in Transmission-Band Linings for Motor Vehicles, of which the following is a specification.

This invention relates to a transmission band lining for motor vehicles, designed primarily for use in connection with motor vehicles of the "Ford" type, but it is to be understood that a lining in accordance with this invention can be employed for any purposes wherein it is found applicable, and the invention has for its object to provide, in a manner as hereinafter set forth, a lining formed throughout of a woolen textile material to overcome the objectionable features existing when using a lining formed from a cotton fabric.

Transmission band linings are encased and operated in a lubricant, the latter during the operation of the vehicle becomes heated substantially to a temperature of 85 degrees Fahr., and such heat acts on the cotton lining to such extent as to cause it to become hard and it soon crystallizes, and when the cotton lining is in such state it causes a very uncertain and uneven starting, stopping and reversing, due to what may be termed grabbing or chattering, and to overcome such hardening and crystallizing of the band lining to prevent grabbing and chattering during the operation of the car is the primary object of this invention, and which is accomplished by providing, in a manner as hereinafter set forth, a lining of textile fabric formed throughout of wool which possesses the following characteristics;—not affected from the heat of the lubricant, does not harden or crystallize, does not grab or chatter, requiring no treatment to keep it soft and pliant, prevents the vehicle from making sudden stops which are caused by hard crystallized linings or bands, insures dependable service due to the soft cushioning effect obtained by setting up the lining from wool threads, and owing to its pliable or resilient nature, due to the wool threads, it enables all surplus lubricant to be expelled therefrom on the application of the foot pedal and taking of a fresh supply of lubricant at each release of the foot pedal.

Further objects of the invention are to provide a transmission band lining, in a manner as hereinafter set forth, which is simple in its construction, formed throughout of wool, compact, strong, durable, pliant, embodying a cushioning function, thoroughly efficient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
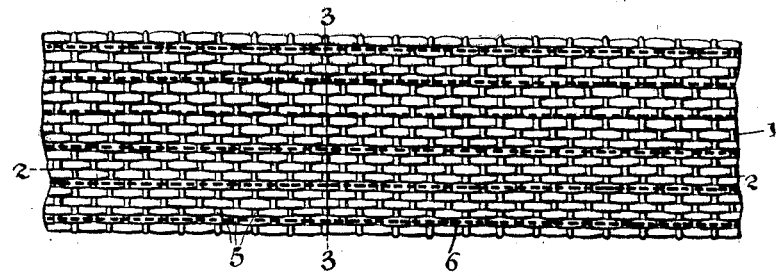
Figure 1 is a top plan view, broken away, of a transmission band lining in accordance with this invention.
Figure 2:
Figure 2 is a section on line 2—2, Figure 1.
Figure 3:
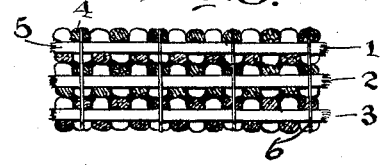
Figure 3 is an enlarged view on line 3—3, Figure 1.

A lining in accordance with this invention is formed of a body portion constructed of a plurality of plies of textile material each formed throughout of wool and as shown, by way of example, the body portion of the band is constructed of three plies 1, 2 and 3. Each ply is of the same thickness and each ply consists of a series of warp threads 4, and transverse weft or filling threads 5. In setting up the plies, the warp threads 4 are black and the weft threads 5 are blue, and the warp threads 4 are of greater thickness than the weft threads 5, although if desired, the warp and weft threads can be of the same diameter and same color.

The plies 1, 2 and 3 are secured together by rows of stitching 6, which extend in the direction in which the warp threads 4 extend. A series of rows of stitching is employed and the outer row at each end of the series is arranged in proximity to the edge of the body portion.

A wool lining, in accordance with this invention, irrespective of the form or shape of the weave, but constructed of wool throughout and also irrespective of the number of plies, provides a lining which is not affected by the heat nor does it harden, crystallize, grab, chatter or need any treatment whatsoever to keep it soft and pliant, due to the fact that it possesses a resilient and an absorbent characteristic, so that when compressed it will expel the lubricant, and when extended take up the lubricant, and as it does not harden or crystallize it prevents the vehicle from making sudden stops and as it remains pliant and soft, it insures dependable service and overcomes the objectionable features present in a hard or crystallized lining, and although the foregoing description, taken in connection with the accompanying drawing, illustrated an embodiment of the invention, yet it is to be understood that changes in the details of construction can be had which will fall within the light of the invention as claimed.

What I claim is:—

1. A transmission band lining comprising an expansible and contractile absorbent body portion consisting solely of a plurality of superposed plies of textile material each similar in construction and each formed throughout of woolen threads, and a series of rows of stitching extending lengthwise of said body portion for securing said plies together in abutting relation, the outer rows of said series being arranged in close proximity to the side edges of said body portion.

2. A transmission band lining comprising an expansible and contractile absorbent body portion consisting solely of a plurality of superposed plies of textile material secured together in abutting relation, each of said plies consisting solely of woolen warp threads and woolen weft threads, and with said warp threads of greater thickness than the weft threads.

3. A transmission band lining comprising an expansible and contractile absorbent body portion consisting of a plurality of abutting plies of textile material each similar in construction and each formed throughout solely of oppositely extending woolen threads, the threads extending in one direction being of greater thickness than the threads extending in the other direction, and a series of rows of stitching lengthwise of said body portion for maintaining said plies in abutting relation, the outer rows of said series being arranged in close proximity to the side edges of the body portion.

In testimony whereof, I affix my signature hereto.

GEORGE W. DAVIS.